United States Patent Office 2,839,535
Patented June 17, 1958

2,839,535

PROCESS FOR THE MANUFACTURE OF NITRILES

David James Hadley, Epsom Downs, and Barrie Wood, Epsom, England, assignors to The Distillers Company Limited, Edinburgh, Scotland, a British company No Drawing. Application November 14, 1955
Serial No. 546,777

Claims priority, application Great Britain
December 9, 1954

14 Claims. (Cl. 260—294.9)

The present invention refers to an improvement in a process for the manufacture of nitriles and relates, in particular, to an improved process for the production of cyanopyridines.

Cyanopyridines have acquired a great importance in recent years since they form the starting materials for a number of very valuable pharmaceutical intermediates and other commodities and various processes have been proposed for producing them. Some of these use as starting materials picolines and treat them by passing them in the presence of ammonia and at high temperatures over catalysts consisting of molybdenum oxide which may be supported on activated alumina. The conversion of the picoline used into the cyanopyridine per pass was, however, very small, amounting only to 1½% by weight of the picoline charged.

According to another suggestion, the reaction of the picolines with ammonia is effected in the presence of molecular oxygen using an oxidation catalyst containing the oxides of vanadium, molybdenum and phosphorus. By using beta-picoline as the starting material and employing a mixture of the three oxides on alundum as support, a maximum of 65.8% of the picoline was converted yielding 57.5 mol. percent of the corresponding nitrile so that the total yield based on the beta-picoline charged amounted to 37.8%. When gamma-picoline was treated in a similar way 75% thereof was reacted with about a 59 mol. percent yield of the gamma-cyanopyridine, that is a total of 44.3% on the gamma-picoline charged. In a further proposal, alkyl pyridines with not more than four carbon atoms in any alkyl substituent on the pyridine ring are contacted in the vapour phase and in admixture with ammonia and a free oxygen-containing gas at an elevated temperature with a catalyst composed of an oxide or salt of a metal of the fifth, sixth or eighth group of the periodic system. The activity of the catalyst according to this proposal may be regulated by the addition of carriers, amongst which alumina is specified as promoting the reaction.

Finally, in a process described in Industrial and Engineering Chemistry, volume 44, page 1630 (1952), a catalyst for the production of beta- and gamma-cyanopyridine from a mixture of the corresponding picolines with ammonia and air is used consisting of vanadium oxide distributed on activated alumina and the resulting yields calculated on the picolines charged were 60% in the case of beta-picoline and 23% on gamma-picoline. It is an object of the present invention to provide a process for the production of cyanopyridines which will result in yields considerably higher than those obtained by the previously known processes. It is a further object to provide a catalyst which will lead to these superior results.

It has now been found that increased yields of cyano-pyridines are obtained if the corresponding picolines in the vapour phase, together with ammonia and molecular oxygen are passed at elevated temperatures, preferably in the range from about 250° C. to about 350° C., over a vanadium oxide catalyst supported on activated alumina which has been heated to a temperature exceeding 1,000° C., preferably in the range from 1,000° C. to about 1,450° C., before it is charged with the vanadium compound which is to be converted subsequently into the oxide. The vanadium oxide may be conveniently produced from ammonium vanadate or from water-soluble vanadyl compounds by suitably heating them in air until practically complete conversion into the oxide has taken place. By water-soluble vanadyl compounds are meant those compounds of vanadium which result from the reaction in an aqueous medium of vanadium pentoxide or ammonium vanadate with an acid and which are decomposed to vanadium oxide when heated in air. Such acids are, for instance, hydrochloric acid, hydrobromic acid and oxalic acid.

However, the optimum temperatures at which the activated alumina should be preheated before being charged with the vanadium oxide depends upon the initial vanadium compound to be converted into the oxide. Thus it has been ascertained that a temperature range between 1,000° C. and 1,400° C., for the preliminary heat treatment will give optimum yields of cyanopyridines if vanadyl chloride or bromide is used subsequently for charging the alumina support with the vanadium oxide, whilst slightly higher temperatures of 1,200° C. to 1,450° C. furnish the best yields if ammonium vanadate or vanadyl oxalate serve as starting material for the vanadium oxide, but in each case the precise temperature which will yield optimum results, may be ascertained by experiment.

It has been found, furthermore, that by using vanadyl compounds as the source of vanadium oxide, a charge of 5% on the alumina carrier will give good results whilst with ammonium vanadate, about 10% of vanadium oxide in the support is required to obtain similar yields of cyanopyridines.

The impregnation of the alumina support according to the invention with vanadium oxide is conveniently carried out by moistening the alumina after it has been given the required preliminary heat treatment with the requisite amount of a preferably concentrated aqueous solution of the vanadium compound, drying the mixture and heating it in a current of air until the vanadium compound is substantially completely decomposed and converted into the oxide.

Since the solubility of ammonium vanadate in water is comparatively small and, in any case, is much smaller than that of the vanadyl compounds mentioned above, a great volume of the aqueous ammonium vanadate solution would be required to impart the desired quantity of the ammonium vanadate to the alumina. It has been found, however, that by immersing the alumina in a quantity of ammonium vanadate solution sufficiently large to secure a final charge of approximately 10% on the alumina, evaporating the solution to dryness and subsequently converting the ammonium vanadate into the oxide, a catalyst resulted which gave inferior results, and that considerably improved yields are obtainable by immersing the alumina in a saturated aqueous ammonium vanadate solution in an amount which will yield an ultimate deposit on the alumina of about 5%, converting the ammonium vanadate to vanadium oxide by appropriate heating and subjecting the resulting product to a subsequent further immersion in a saturated ammonium vanadate solution and heating whereby an additional deposition of about 5% vanadium oxide results.

As molecular oxygen-containing gas air may be used in conjunction with ammonia for the conversion of the picoline into the corresponding cyanopyridine, and alpha-, beta- as well as gamma-picoline may be used equally successfully for the said process. The picoline is most suitably employed in a concentration of approximately 1.5–2 by volume based upon the total gas mixture to be passed over the catalyst. Whilst the molecular ratio of ammonia to picoline in the gas mixture may vary to some extent, a ratio by volume of 1.5–2.0 parts to 1 part of the vaporised picoline has been found to give good results. The reaction may be carried out at ordinary or increased pressure. It is preferred, however, to operate at atmospheric pressure.

The contact time between the gaseous mixture and the catalyst may also vary depending on the size, i. e., the diameter of the contact bed and the temperature at which the reaction is effected and may be from 0.25 to about 7 seconds. Under certain conditions even longer times may be used. The contact times giving optimum results can be readily ascertained by preliminary experiments. By "contact time" is meant the time required for one volume unit of the gaseous mixture measured at room temperature and atmospheric pressure, to pass through one unit volume occupied by the catalyst bed.

It has been found, furthermore, that the temperatures at which the process according to the invention is effected with optimum results vary with the kind of picoline charged and that for beta-picoline and its conversion into 3-cyanopyridine a range between about 300° and 380° C. preferably between 325° and 350° C. furnishes excellent yields whilst with alpha- and gamma-picoline the useful temperature range is between 260° and 350° C., preferably between 300° and 325° C. Higher temperatures than those indicated as upper limits may in some cases occur in the reaction zone without detrimental effect, provided that the contact times are shortened correspondingly. Similarly it is possible to have higher temperatures in a part of the reaction zone, as long as the mean reaction temperature is within the limits mentioned.

By effecting the reaction in accordance with the process of the invention, the picoline charged is substantially completely reacted upon a single pass so that the recovery of unreacted starting material is unnecessary, while the conversion of picoline into carbon dioxide, if any should occur, is reduced to a minimum by the use of a catalyst in accordance with the process of the invention, the amount of this complete combustion decreasing with the increase in temperature of the preliminary heat treatment.

The following tables show the results which may be obtained with an alumina support which has been given a preliminary heat treatment at different temperatures when beta-picoline is treated according to the present invention and that the results are superior when the temperatures have been within the limits indicated.

TABLE 1

[Vanadium oxide prepared from vanadyl chloride; 10% $V_2O_5$ on alumina.]

| Activated $Al_2O_3$ heated at °C. for 22 hours | Yield of 3-cyanopyridine, percent of beta-picoline fed |
| --- | --- |
| None | 54 |
| 1,000 | 57 |
| 1,100 | 82 |
| 1,200 | 76 |
| 1,350 | 72 |
| 1,400 | 59 |
| 1,450 | 35 |

TABLE 2

[Vanadium oxide prepared from vanadyl oxalate; 10% $V_2O_5$ on alumina.]

| Activated $Al_2O_3$ heated at °C. for 22 hours | Yield of 3-cyanopyridine based on beta-picoline fed |
| --- | --- |
| 1,000 | <40 |
| 1,200 | 61 |
| 1,300 | 80 |
| 1,400 | 75 |
| 1,450 | 62 |

An activated alumina heated at the same temperatures, but subsequently charged with 5% vanadium oxide originating from vanadyl oxalate furnished similar results when used under otherwise the same conditions.

Whilst an alumina heated to 1100° C. before it was charged with 5% of vanadium oxide derived from ammonium vanadate yielded as catalyst only 51% 3-cyanopyridine, a carrier containing 10% of vanadium oxide on the similarly treated alumina by repeated immersion in ammonium vanadate solution and conversion into the oxide after each immersion furnished under similar conditions 75% of 3-cyanopyridine. On the other hand, when the deposition of 10% of vanadium oxide was carried out in a single operation by immersion in an amount of ammonium vanadate solution sufficient to supply the desired percentage of vanadium oxide, the yield obtained was 57% of 3-cyanopyridine with an alumina previously heated at 1350° C., whilst a deposition by a double treatment each resulting in a 5% deposit furnished under the same conditions a conversion of 80% of beta-picoline into 3-cyanopyridine.

Similarly, greatly improved results were obtained when gamma-picoline was treated in accordance with the process of the invention.

The following examples illustrate the way in which the process of the invention is carried out in practice. In these examples as well as in the foregoing description and in the appended claims percentages are by weight unless otherwise stated.

*Example 1*

A catalyst was prepared by heating activated alumina, of a size which passed an eight mesh sieve (British standard specification), and was retained on a sixteen mesh sieve, for 22 hours at 1100° C. After cooling, the alumina was moistened with a concentrated aqueous vanadyl chloride solution in an amount to furnish ultimately a 10% $V_2O_5$ deposit on the alumina and the mixture was then dried. The vanadyl chloride was obtained by dissolving ammonium vanadate in concentrated hydrochloric acid. The alumina thus impregnated with vanadyl chloride was heated for sixteen hours in a liquid bath maintained at 380° C. whilst a current of air was passed over it.

The resulting catalyst was placed in a 6 mm. bore glass tube which was heated by a liquid bath to 350° C. A gas stream containing 1.6% by volume of beta-picoline vapour in air, to which 3.0% by volume of gaseous ammonia had been added, was conducted over the catalyst at such a rate that the contact time amounted to 5.5 seconds. The resulting gas mixture which contained a small amount of hydrogen cyanide and carbon dioxide was scrubbed with water, the aqueous solution extracted with ether and the ether distilled off. There remained a solid residue which consisted of substantially pure 3-cyanopyridine. The yield thus obtained amounted to 82% based on the beta-picoline charged.

*Example 2*

A catalyst was prepared as described in Example 1 and then used for the treatment of gamma-picoline in the manner described in Example 1. The yield of 4-cyanopyridine amounted to 67% on the gamma-picoline charged.

Example 3

A catalyst was prepared by impregnating alumina which had been previously heated to a temperature of 1300° C. with a concentrated aqueous solution of vanadyl oxalate. The alumina thus impregnated with 5% vanadium oxide was dried and heated in a current of air until the vanadyl oxalate was substantially completely converted into the oxide.

A gas current of a composition similar to that described in Example 1 was conducted over the catalyst heated at 350° C. The resulting reaction gas mixture was scrubbed with water and the aqueous solution extracted as described in Example 1. A yield of 3-cyanopyridine of 80% on the beta-picoline charged was obtained.

Example 4

A gaseous mixture of 2.0% by volume of gamma-picoline and 3.2% by volume of ammonia in air was passed over a catalyst comprising 10% vanadium oxide prepared from vanadyl oxalate distributed on activated alumina which had previously been heated at 1350° C. for 22 hours.

The reaction tube containing the catalyst was kept in a bath heated at 305° C. and the contact time was five seconds. The yield of 4-cyanopyridine amounted to 80% on the gamma-picoline charged.

Example 5

Batches of activated alumina were heated for 22 hours at the temperatures shown in the table below and were then impregnated twice with 5% $V_2O_5$ each by immersion in a saturated aqueous solution of ammonium vanadate in amount which will ultimately furnish the 5% $V_2O_5$ when the mixture is taken to dryness and heated. The catalysts were then used for the production of 3-cyanopyridine from beta-picoline in the manner described in Example 1 using a reaction temperature of 350° C. and a contact time of 6 seconds.

| Temperature of alumina heat treatment, °C. | Percent yield of 3-cyanopyridine |
| --- | --- |
| 1,000 | 53 |
| 1,150 | 80 |
| 1,300 | 53 |
| 1,450 | 20 |

Example 6

A mixture of 2% by volume of alpha-picoline and 3% of ammonia in air was conducted at a rate of 15 litres/hour over 20 grams of catalyst prepared by impregnating activated alumina previously heated at 1300° C. for 22 hours, with 10% vanadium oxide via vanadyl chloride. The temperature in the reactor as described in Example 1 was 323° C. 59% of the alpha-picoline charged was converted into 2-cyanopyridine.

Example 7

A vertical stainless steel tube with an internal diameter of 3.8 cm. was charged up to a height of 61 cm. with a vanadium oxide catalyst, the alumina carrier having passed a 4 to 8 mesh sieve and having been preliminarily heated for 22 hours at 1350° C. The vanadium oxide prepared from vanadyl oxalate, was in 10% concentration based on the final contact material. The temperature in the steel reactor was controlled by a stirred salt bath surrounding the steel reactor.

A gas mixture consisting of 1.7% by volume of gamma-picoline and 2.8% ammonia in air was conducted through the reactor at an hourly rate of 340 litres (N. T. P.). The mean reaction temperature in the reaction zone was 320–330° C. and the contact time 6–7 seconds. The yield of 4-cyanopyridine during a prolonged run was between 80 and 84% on the picoline charged whilst less than 5% was converted into by-products.

Example 8

A mixture composed as described in Example 7 with the exception that the gamma-picoline was replaced by the same amount of beta-picoline, was passed through a reactor as described in Example 7 under similar conditions, only maintaining the temperature at 350–380° C. The reaction proceeded with results similar to those given in Example 7 and 3-cyanopyridine was obtained in yields of about 80%.

Example 9

A vertical stainless steel reactor with an internal diameter of 4.6 cm. was charged up to a depth of 180 cm. with a catalyst as described in Example 7. A gaseous mixture consisting of 1.75% by volume of gamma-picoline and 2.8 to 2.9% ammonia in air (N. T. P.) was passed through the reactor at a rate of 1400–1550 litres/hour, the temperature in the reactor which was controlled by flue gases at 273–276° C. was on an average about 320° C., but reached in one place a maximum of over 400° C. due to the slowness of the dispersion of heat from the large diameter reactor. The picoline was converted into 4-cyanopyridine with a yield of slightly more than 80%. 3.7% were converted into byproducts and 2.8% remained unreacted.

The activity of the catalyst remained practically unimpaired for more than 200 hours.

We claim:

1. In a process for the production of a cyanopyridine from the corresponding picoline wherein a reaction mixture of the picoline in the vapour phase with ammonia and molecular oxygen is passed at a temperature of about 260° C. to about 380° C. over a vanadium oxide catalyst supported on alumina, the improvement which comprises preparing the catalyst by heating activated alumina to a temperature in the range from 1000° to 1450° C., cooling the thus thermally pre-treated activated alumina, charging the cooled activated alumina with a vanadium compound to be converted into vanadium oxide and effecting the conversion into vanadium oxide in situ in the pre-treated activated alumina by heating in air, the charge of resultant vanadium oxide on the alumina amounting to about 5 to 10% by weight.

2. The process claimed in claim 1 wherein the activated alumina is heated to a temperature in the range from 1100° to 1350° C. and the vanadium compound to be converted into vanadium oxide is vanadyl chloride.

3. A process for the production of cyanopyridine from the corresponding picoline wherein a reaction mixture of the picoline in the vapor phase with ammonia and molecular oxygen is passed at a temperature of about 260° C. to about 380° C. over an activated alumina supported vanadium oxide catalyst prepared by heating activated alumina to a temperature in the range from 1100° C. to 1350° C., cooling the thus thermally pre-treated activated alumina, charging the cooled activated alumina with vanadyl chloride and converting the vanadyl chloride into vanadium oxide in situ in the pre-treated activated alumina by heating in air, the charge of the resultant vanadium oxide on the alumina amounting to 5% by weight.

4. The process claimed in claim 1 wherein the activated alumina is heated to a temperature in the range from 1100° to 1350° C. and the vanadium compound to be converted into vanadium oxide is vanadyl bromide.

5. In a process for the production of a cyanopyridine from the corresponding picoline wherein a reaction mixture of the picoline in the vapor phase with ammonia and molecular oxygen is passed at an elevated temperature over a vanadium oxide catalyst supported on alumina, the improvement wherein the catalyst is prepared by heating activated alumina to a temperature in the range from 1100° C. to 1350° C., cooling the thus thermally pre-treated activated alumina, charging the cooled activated alumina with vanadyl bromide and converting the vanadyl bromide into vanadium oxide in situ in the pre-treated activated alumina by heating in air, the charge of the resultant vanadium oxide on the alumina amounting to 5% by weight, whereby the cyanopyridine is produced at a temperature within the range from about 260° C. to about 380° C.

6. The process claimed in claim 1 wherein the activated alumina is heated to a temperature in the range from 1200° to 1450° C. and the vanadium compound to be converted into vanadium oxide is vanadyl oxalate.

7. The process claimed in claim 6 wherein the charge of vanadium oxide on the alumina amounts to 5% by weight.

8. The process claimed in claim 1 wherein the activated alumina is heated to a temperature in the range from 1200° to 1450° C. and the vanadium compound to be converted into vanadium oxide is ammonium vanadate.

9. The process claimed in claim 8 wherein the charge of vanadium oxide on the alumina amounts to 10% by weight.

10. The process claimed in claim 9 wherein the pre-treated activated alumina is charged with the ammonium vanadate by impregnating the alumina more than once with an aqueous solution of ammonium vanadate, the ammonium vanadate being converted into vanadium oxide after each charging.

11. The process claimed in claim 1 wherein the reaction mixture passed over the catalyst is at a temperature in the range from 300° to 380° C., the picoline being beta-picoline.

12. The process claimed in claim 1 wherein the reaction mixture passed over the catalyst is at a temperature in the range from 260° to 350° C., the picoline being alpha-picoline.

13. The process claimed in claim 1 wherein the reaction mixture passed over the catalyst is at a temperature in the range from 260° to 350° C., the picoline being gamma-picoline.

14. The process claimed in claim 1 wherein the reaction mixture is in contact with the catalyst for a period in the range from 0.25 to 7 seconds.

References Cited in the file of this patent

UNITED STATES PATENTS

| | | |
|---|---|---|
| 2,180,353 | Foster | Nov. 21, 1939 |
| 2,206,377 | Weiss | July 2, 1940 |
| 2,219,333 | Rogers | Oct. 29, 1940 |
| 2,425,398 | Ruthruff | Aug. 12, 1947 |
| 2,485,342 | Welty | Oct. 18, 1949 |
| 2,510,605 | Porter et al. | June 6, 1950 |
| 2,510,803 | Cooper | June 6, 1950 |
| 2,576,625 | Miller | Nov. 27, 1951 |
| 2,581,068 | Beach | Jan. 1, 1952 |
| 2,592,123 | Denton et al. | Apr. 8, 1952 |